United States Patent
Hooyman et al.

(10) Patent No.: US 9,643,266 B1
(45) Date of Patent: May 9, 2017

(54) EXTENDABLE FOLDING SAW

(75) Inventors: Andrew Hooyman, Menasha, WI (US); William Hooyman, Kiel, WI (US); Robert Fuller, West Bend, WI (US); Jason Richards, West Bend, WI (US)

(73) Assignee: Battenfeld Technologies, Inc., Columbia, MO (US)

( * ) Notice: Subject to any disclaimer, the term of this patent is extended or adjusted under 35 U.S.C. 154(b) by 758 days.

(21) Appl. No.: 11/977,948

(22) Filed: Oct. 26, 2007

Related U.S. Application Data

(60) Provisional application No. 60/854,890, filed on Oct. 27, 2006.

(51) Int. Cl.
| | |
|---|---|
| *B23D 51/01* | (2006.01) |
| *B23D 51/03* | (2006.01) |
| *B25G 1/04* | (2006.01) |
| *B26B 21/52* | (2006.01) |

(52) U.S. Cl.
CPC ............ *B23D 51/01* (2013.01); *B23D 51/03* (2013.01); *B25G 1/046* (2013.01); *B26B 21/523* (2013.01)

(58) Field of Classification Search
CPC .... B26B 29/025; B25G 18/08; B25G 18/085; B25G 1/04; B25G 1/043; B25G 1/046; B25G 1/08; B25G 1/085; A01G 3/08; A01G 3/081; A01G 3/083; B23D 51/01; B23D 51/03
USPC ......... 30/340, 506, 507, 509, 510, 514, 517, 30/518, 519, 166.3, 25, 329–339, 296.1, 30/143, 151; 16/429, 427, DIG. 25; 285/302; 473/296; 138/20; 403/109.1–109.8, 381, 377, 331, 354; 15/144.3, 144.4; 81/489; 224/232
See application file for complete search history.

(56) References Cited

U.S. PATENT DOCUMENTS

| | | | | |
|---|---|---|---|---|
| 660,204 | A | * 10/1900 | Seelye | ............................... 7/145 |
| 763,100 | A | * 6/1904 | Howell | ................... A47L 13/20 |
| | | | | 15/145 |
| 1,639,614 | A | * 8/1927 | Rosson | ......................... 403/258 |
| 1,769,400 | A | * 7/1930 | Talmage | ..................... 30/166.3 |
| 1,797,589 | A | 3/1931 | Price | |
| 1,943,890 | A | * 1/1934 | Gibson et al. | ................ 261/115 |
| 2,286,530 | A | * 6/1942 | Fordon | .......................... 30/525 |

(Continued)

FOREIGN PATENT DOCUMENTS

DE          7425295       * 7/1974    ............... A01G 3/08

OTHER PUBLICATIONS 7425295 english translation; Dominicus D and Co; Jul. 1974.*

(Continued)

*Primary Examiner* — Laura M Lee
(74) *Attorney, Agent, or Firm* — Senniger Powers LLP

(57) ABSTRACT

The present invention relates to an extendable folding saw that is lightweight and compact when retracted yet rigid when extended. In one embodiment, the extendable folding saw can have a folding saw and a removably attached extension. The folding saw can have a grip and a pivotally attached saw. The extension can comprise several members that are compactable to a length not much greater than the length of the longest individual member. The members of the extension can have a generally I shaped profile. The extension rod can be attached to the folding saw in a snap-fitting manner for use. A retracted folding saw can be snapped side-by-side to a retracted to extension rod for storage.

9 Claims, 8 Drawing Sheets

(56) References Cited

U.S. PATENT DOCUMENTS

| | | | |
|---|---|---|---|
| 2,593,323 A | | 4/1952 | Magnussen et al. |
| 3,039,340 A | * | 6/1962 | Zimmerman ............. 81/177.85 |
| 3,076,263 A | * | 2/1963 | Musto ............................ 30/317 |
| 3,347,575 A | | 10/1967 | Morris |
| 3,613,283 A | | 10/1971 | Mozey |
| 3,805,552 A | * | 4/1974 | Heald ........................... 464/162 |
| D237,458 S | | 11/1975 | Laughlin |
| 3,973,179 A | * | 8/1976 | Weber et al. ................. 320/113 |
| 4,050,003 A | * | 9/1977 | Owings et al. .............. 320/113 |
| 4,082,186 A | * | 4/1978 | Chirumbolo ............ A47L 13/50 |
| | | | 15/145 |
| 4,122,601 A | * | 10/1978 | Katsuya ...................... 30/298.4 |
| 4,167,811 A | | 9/1979 | Barrett |
| 4,553,753 A | * | 11/1985 | Gibbons ........................ 473/560 |
| 4,622,022 A | * | 11/1986 | Diffenderfer et al. ........ 464/162 |
| 4,654,971 A | * | 4/1987 | Fettes et al. ..................... 30/383 |
| 4,660,284 A | | 4/1987 | Decarolis |
| 4,687,012 A | * | 8/1987 | Schultes et al. ................ 135/75 |
| 4,716,653 A | * | 1/1988 | Skyba ......................... 30/296.1 |
| D300,112 S | | 3/1989 | Osterhout |
| D304,154 S | | 10/1989 | Osterhout |
| 4,900,090 A | * | 2/1990 | Davis ......................... 297/440.1 |
| 4,919,558 A | * | 4/1990 | Mascitelli et al. ................. 403/9 |
| 4,926,522 A | * | 5/1990 | Wang ........................ B25F 1/02 |
| | | | 15/144.1 |
| 4,947,551 A | | 8/1990 | Deisch |
| 4,976,031 A | * | 12/1990 | Miller ......................... 30/296.1 |
| 5,063,628 A | | 11/1991 | Campbell |
| 5,074,081 A | * | 12/1991 | Beth et al. ...................... 451/344 |
| 5,167,069 A | * | 12/1992 | Quinn ............................ 30/527 |
| D346,937 S | | 5/1994 | Backman |
| 5,400,457 A | * | 3/1995 | Ridgley ............... A46B 5/0033 |
| | | | 15/144.4 |
| 5,477,750 A | * | 12/1995 | Korzan ........................ 74/579 R |
| 5,507,203 A | * | 4/1996 | Audibert et al. ................ 74/492 |
| 5,515,574 A | * | 5/1996 | Larson ............................ 16/429 |
| 5,538,474 A | * | 7/1996 | Kretschmer et al. .......... 464/162 |
| 5,553,386 A | | 9/1996 | Hsu |
| 5,579,558 A | * | 12/1996 | Newman et al. ............... 16/429 |
| 5,634,276 A | | 6/1997 | Lin |
| 5,636,697 A | * | 6/1997 | Pitchford ..................... 168/48.1 |
| 5,694,695 A | | 12/1997 | Lund |
| D392,164 S | | 3/1998 | Bomgaars, Jr. ..................... D8/9 |
| D397,281 S | * | 8/1998 | Hsu ................................ D8/95 |
| 5,787,536 A | | 8/1998 | Pate |
| 5,787,590 A | | 8/1998 | D'Alessandro, Sr. |
| 5,794,345 A | | 8/1998 | Ryon et al. |
| 5,810,408 A | * | 9/1998 | Armstrong ............... A01B 1/00 |
| | | | 16/422 |
| 5,845,404 A | * | 12/1998 | Jeffcoat ........................... 30/125 |
| 5,860,216 A | | 1/1999 | Shellnutt |
| D406,039 S | | 2/1999 | Okada |
| 5,911,481 A | | 6/1999 | Yost |
| 5,924,210 A | * | 7/1999 | Hung ....................... B23D 51/01 |
| | | | 30/166.3 |
| 5,926,911 A | * | 7/1999 | Chen ............................. 16/111.1 |
| 6,014,785 A | * | 1/2000 | Punch et al. ....................... 7/105 |
| 6,035,873 A | * | 3/2000 | Lin et al. ..................... 135/25.1 |
| D426,436 S | | 6/2000 | Ng |
| D433,914 S | | 11/2000 | Chu |
| 6,181,032 B1 | * | 1/2001 | Marshall et al. ............. 307/150 |
| 6,217,455 B1 | * | 4/2001 | Yanata ........................... 464/113 |
| 6,240,642 B1 | * | 6/2001 | Templeton ..................... 30/125 |
| D444,684 S | * | 7/2001 | Kimura .............................. D8/9 |
| 6,253,455 B1 | | 7/2001 | Eriksson et al. |
| 6,298,564 B1 | | 10/2001 | Voser et al. |
| 6,371,686 B1 | * | 4/2002 | Wu ................................ 403/377 |
| 6,446,341 B1 | | 9/2002 | Wang et al. |
| 6,488,511 B1 | * | 12/2002 | Stewart ........................... 439/32 |
| 6,536,723 B1 | * | 3/2003 | Nakatani .................... 248/163.1 |
| 6,560,805 B2 | | 5/2003 | Dallas |
| D482,257 S | | 11/2003 | Taylor et al. |
| 6,694,620 B2 | * | 2/2004 | Kanzawa ........................ 30/161 |
| 6,742,264 B1 | | 6/2004 | Urion |
| 6,796,389 B2 | * | 9/2004 | Pusateri et al. ............... 173/170 |
| 6,830,227 B2 | | 12/2004 | Nakatani |
| 6,854,697 B2 | | 2/2005 | Akaike |
| 6,883,208 B1 | * | 4/2005 | Huang ............................. 16/429 |
| 6,898,858 B1 | | 5/2005 | Spell |
| 7,017,234 B2 | | 3/2006 | Anderson |
| 7,065,885 B1 | | 6/2006 | Chen |
| D530,180 S | | 10/2006 | Klecker et al. |
| D551,524 S | | 9/2007 | Norton et al. |
| 7,337,933 B1 | * | 3/2008 | Klinberg ................. A47G 25/82 |
| | | | 223/118 |
| 7,574,806 B2 | * | 8/2009 | Wang ............................. 30/340 |
| 7,600,287 B1 | * | 10/2009 | Moore .................. A46B 5/0033 |
| | | | 15/144.1 |
| 7,802,340 B2 | | 9/2010 | Knopow et al. |
| 8,266,806 B2 | | 9/2012 | Holmroos |
| 2002/0194739 A1 | | 12/2002 | Krane et al. |
| 2003/0177648 A1 | | 9/2003 | Zeiter |
| 2004/0020062 A1 | | 2/2004 | Ducret |
| 2004/0107585 A1 | | 6/2004 | Heimrich |
| 2005/0097691 A1 | * | 5/2005 | Tsuchiya ................. A47L 13/20 |
| | | | 15/144.4 |
| 2006/0048397 A1 | | 3/2006 | King et al. |
| 2007/0187441 A1 | * | 8/2007 | Klinberg ................. A47G 25/82 |
| | | | 223/118 |
| 2007/0240545 A1 | * | 10/2007 | Lin ............................... 81/177.2 |
| 2008/0109975 A1 | * | 5/2008 | Park ......................... B25G 3/38 |
| | | | 15/105 |
| 2009/0064511 A1 | | 3/2009 | Crawford |

OTHER PUBLICATIONS

Fiskars Brands, Inc., Tele-Cutter Extendable Pruner, as viewed on Feb. 20, 2008 at www.gerbergear.com/product.php?model=1512. (1 page).
Trail Blazer, Marks Choice Xtend-A-Saw, as viewed on Feb. 20, 2008 at www.trailblazerproducts.com/products/list/showcase/?id=63. (2 pages).
Buckwing Products, Inc., Archery Hunters Back Pack Extension Saw & Pruner, as viewed on Feb. 20 and 21, 2008 at www.buckwing.com/tools.html (2 pages).
Go Way Out, Hunting Accessories including Saw, Trimmer and Poles, as viewed on Feb. 20, 2008 at www.gowayout.com/. (1 page).
Stoney Point, PoleCat Pole Saw Attachment, as viewed on Feb. 20, 2008 at www.midwayusa.com/eprductpage.exe/showpage?saleitemid=852382&utm_source . . . (1 page).
Final Rejection dated Dec. 5, 2014, U.S. Appl. No. 12/731,373, 10 pages.
Non-Final Rejection dated Feb. 20, 2013, U.S. Appl. No. 12/731,373, 10 pages.
Final Rejection dated Nov. 7, 2013, U.S. Appl. No. 12/731,373, 11 pages.
Non-Final Rejection dated May 21, 2014, U.S. Appl. No. 12/731,373, 9 pages.

* cited by examiner

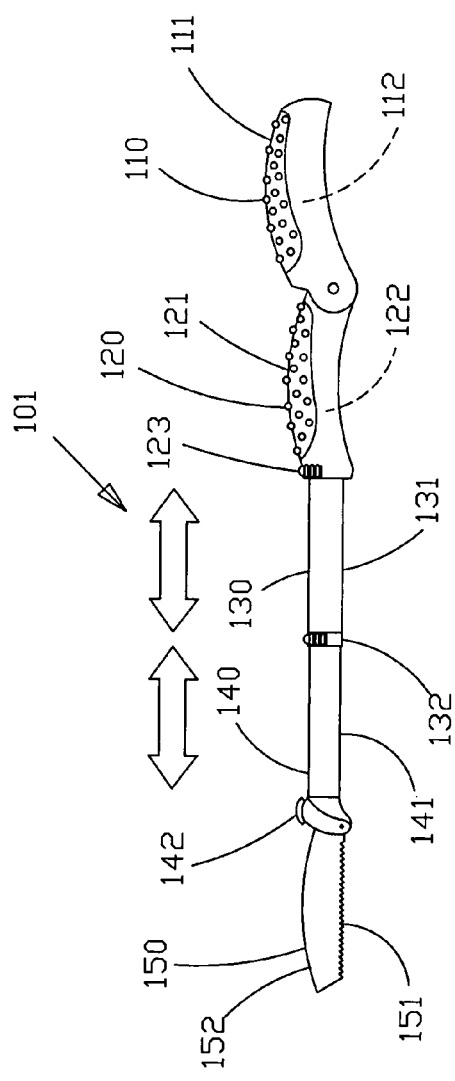
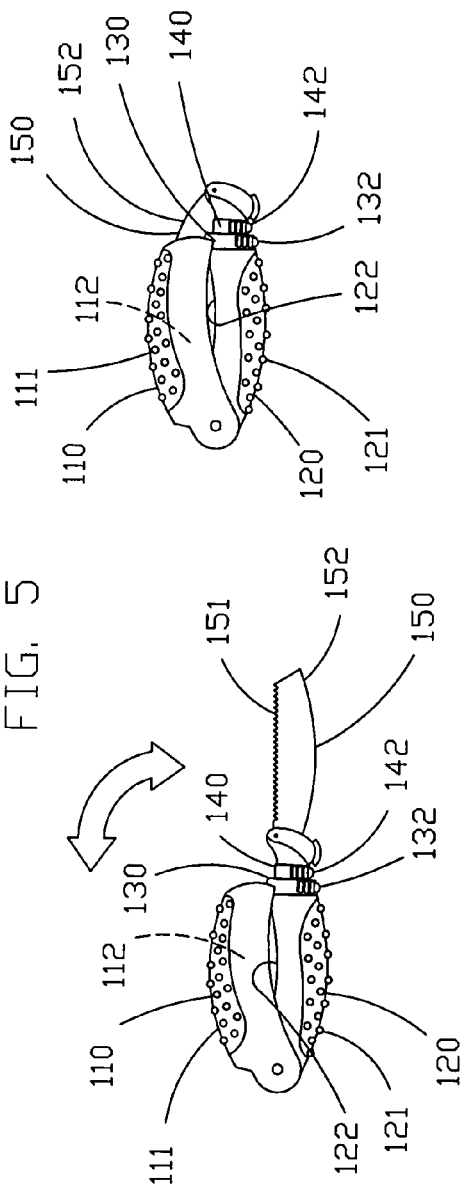
FIG. 5
FIG. 6
FIG. 7

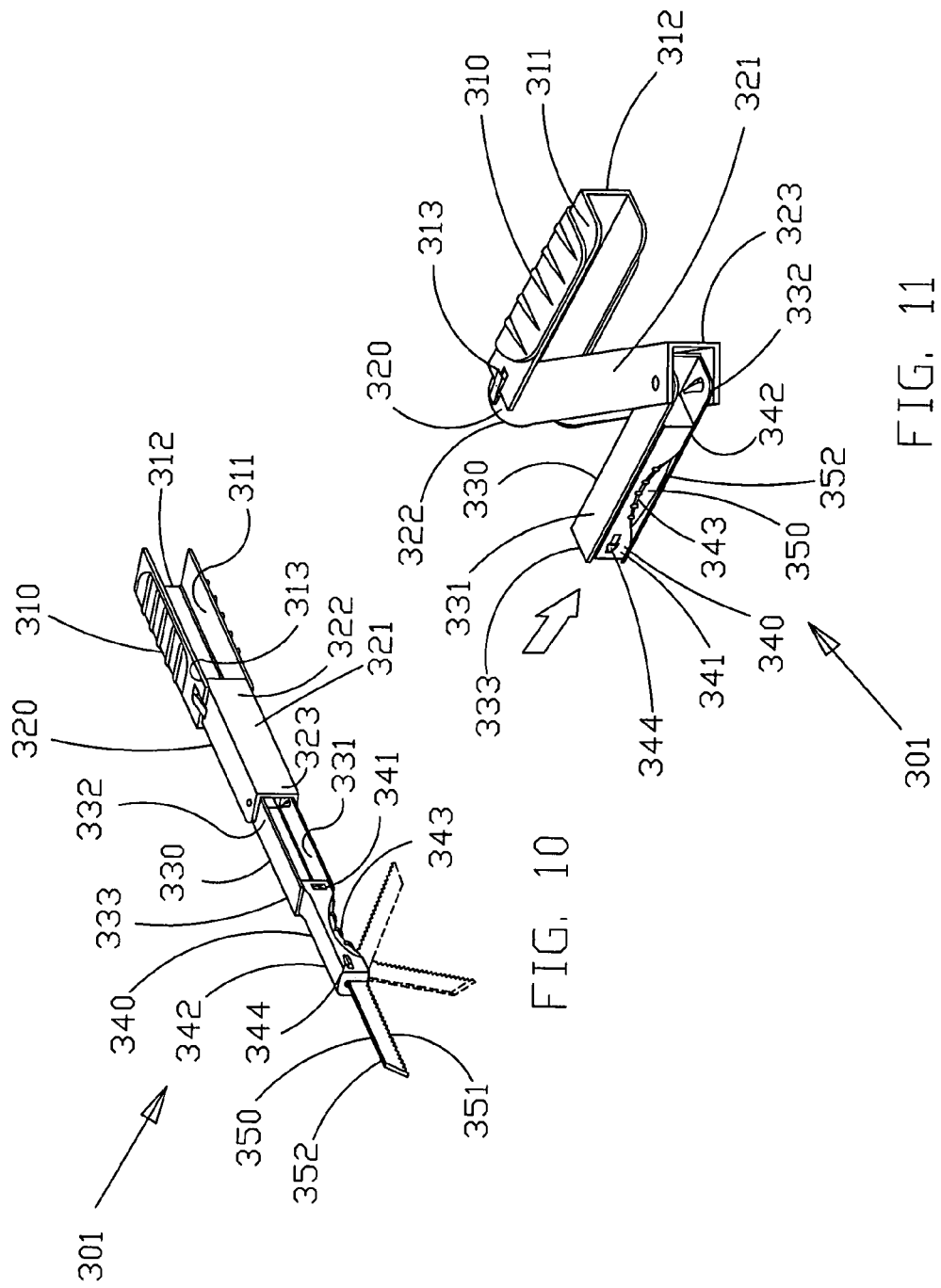

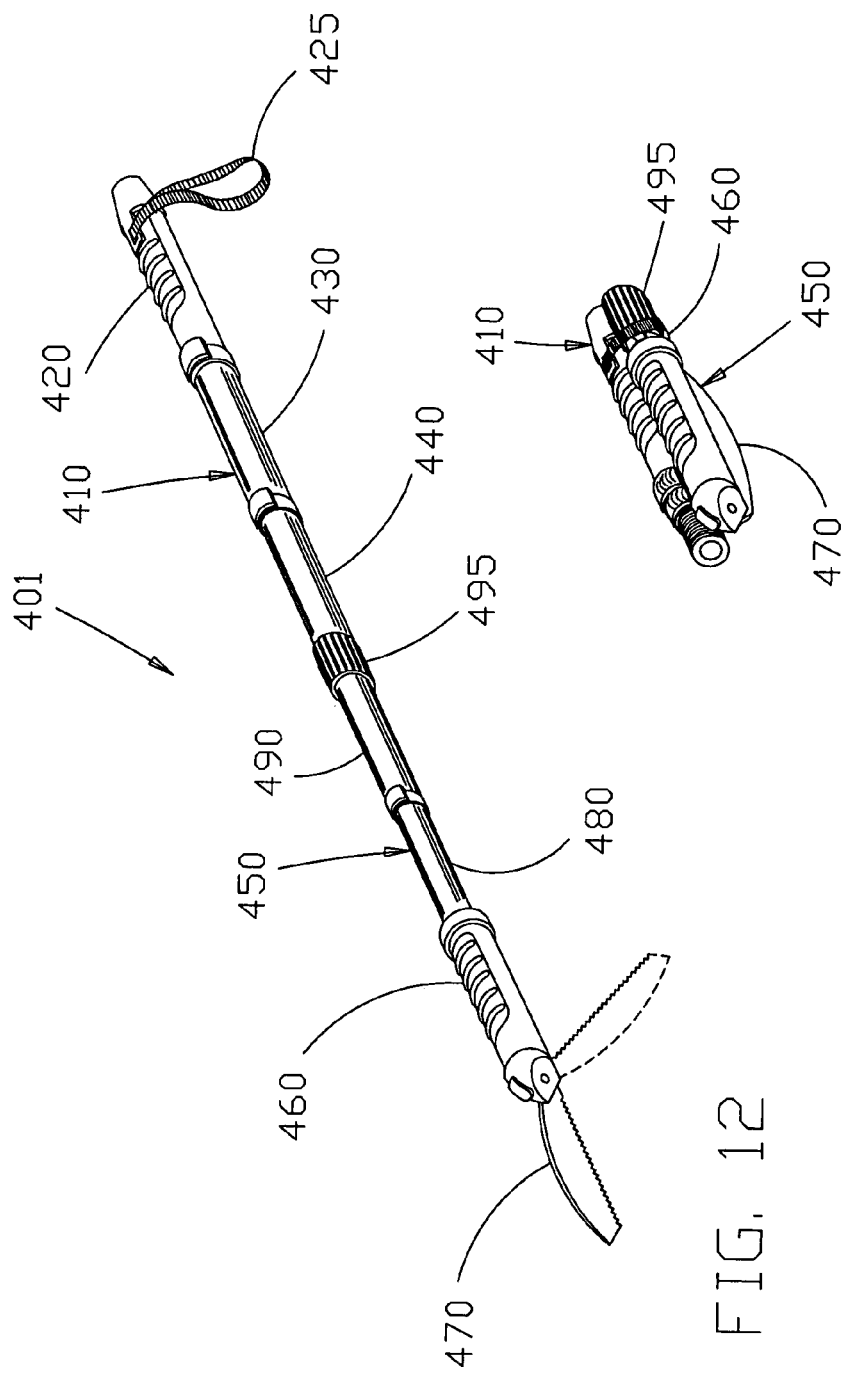

EXTENDABLE FOLDING SAW

This application claims priority on US Provisional Application having application No. 60/854,890, filed on Oct. 27, 2006, the entire disclosure of which is hereby incorporated herein by reference.

BACKGROUND OF THE INVENTION

1. Field of the Invention

The present invention relates to an extendable folding saw that is lightweight and compact when retracted yet rigid when extended.

2. Description of the Related Art

Several cutting products have been developed over the years. Some are designed for use as folding saws, and others for use as extending saws. Some examples of currently available products include:

Gerber makes an extendable pruner under the name Tele-Cutter. This pruner has a telescoping extension pole. Yet, the blade does not retract into a handle, which can limit the safety of the device when not in use.

Trail Blazer makes a saw called Xtend-A-Saw. This item features a handle with a socket for threadably receiving the end of an extension pole. The extension pole is not shown to be retractable. As such, the ability to transport this tool is limited, and is not possible to store in a day bag when not in use.

Buckwing Products, Inc. makes an extension saw and pruner. This product measures 21 inches when folded up.

Gowayout.com sells a saw that is comprised of three pieces, a saw, a trimmer and a pole. The pole does not connect directly to the saw, but rather to the trimmer.

Stoney Point makes a pole saw for use with a PoleCat Monopod.

U.S. Pat. No. 6,240,642 to Templeton is titled Compact Pruning Saw. This patent shows a telescoping series of coaxial nested tubes that extend to provide an elongated handle. Each inner tube has a back end with a gradual conical flare. At full extension, the tube stops bind against each other, and screws and clamps are explicitly taught to be unnecessary. A saw blade with a threaded end is fitted into a threaded fitting on the end of the innermost tube. While this product may work well for its intended purposes, it is not without some drawbacks. First, there is no way to lock segments in place intermediate a fully extended and the fully retracted positions. Also, there is no way to use the present invention as a hand saw or folding saw.

U.S. Pat. No. 4,716,653 to Skyba is titled Tree Saw with Extension Attachment. This patent teaches that a tree saw uses a flexible sapling or tree limb as a handle extension to permit a person to cut tree branches beyond his normal reach. One drawback with this invention is that its use is dependant upon the location of a suitable flexible sapling or tree limb. Further, the destruction of a sapling or tree limb can unnecessary take a toll on the environment.

U.S. Pat. No. 5,911,481 to Yost is titled Pocket Hand Saw. This invention describes a water tight compartment for storing the blade when not in use. While this invention may be useful for its intended purpose, it does not show the use of an extension.

All of these products may all work well for their intended purposes. Yet, none of them shows an extension saw that is compactable to approximately 12 inches or less.

None of the above-products are designed for storage or transport in a side-by-side connected manner.

None of the above-products utilize a generally I beam design to increase the strength to weight ratio.

None of the above-products has a snap fitting and direct connection between the pole and the saw.

Thus there exists a need for an extendable folding saw that solves these and other problems.

SUMMARY OF THE INVENTION

The present invention relates to an extendable folding saw that is lightweight and compact when retracted yet rigid when extended. In one embodiment, the extendable folding saw can have a folding saw and a removably attached extension. The folding saw can have a grip and a pivotally attached saw. The extension can comprise several members that are compactable to a length not much greater than the length of the longest individual member. The members of the extension rod can have a generally I shaped profile. The extension rod can be attached to the folding saw in a snap-fitting manner for use. A retracted folding saw can be snapped side-by-side to a retracted to extension for storage.

Advantageously, the extendable folding rod of the present invention is compact in size. This is accomplished by having the invention compact in size to a length slightly greater than the size of the blade. The present invention can be easily transported in backpacks and the like.

Further, the present invention has a relatively large strength to weight ratio. This is advantageously accomplished in a preferred embodiment by having telescoping generally I shaped members. The I shaped design provides stiffness, or resistance to bending, along the direction of the applied force during use of the saw.

Still further, hunters and others will be able to use the present invention in a safe manner. This can be accomplished because the extendable folding saw is extendable up to approximately five feet in length or more depending on application and is light weight. The user can, for example, effectively use the saw to clear shooting lanes while in the tree stand. Being lightweight, the extendable folding saw will minimize fatigue of the user while using the present invention. It is noteworthy that the overall length of the extension rod is variable, depending on the intended use by the user.

Still further yet, the extension rod directly connects to the folding saw. This is advantageous as it minimizes complexity of the present invention by eliminated extra components. Related, the extension can be connected to the folding saw in a snap fitting engagement.

Other advantages, benefits, and features of the present invention will become apparent to those skilled in the art upon reading the detailed description of the invention and studying the drawings.

BRIEF DESCRIPTION OF THE DRAWINGS

FIG. 5 is a side illustration showing an alternative embodiment of the present invention in an extended position.

FIG. 6 is a side view of the embodiment shown in FIG. 5 in a shortened length.

FIG. 7 is a side view of the embodiment shown in FIG. 5 is a fully compacted length.

FIG. 10 is a perspective view of an additional embodiment of the present invention shown in an extended position.

FIG. 11 is a perspective view of the embodiment shown in FIG. 10.

FIG. 12 is a perspective view of an additional embodiment of the present invention shown in an extended position.

FIG. 13 is a perspective view of the embodiment shown in FIG. 12 shown in a compacted position.

DETAILED DESCRIPTION OF THE PREFERRED EMBODIMENTS

Figure 1:
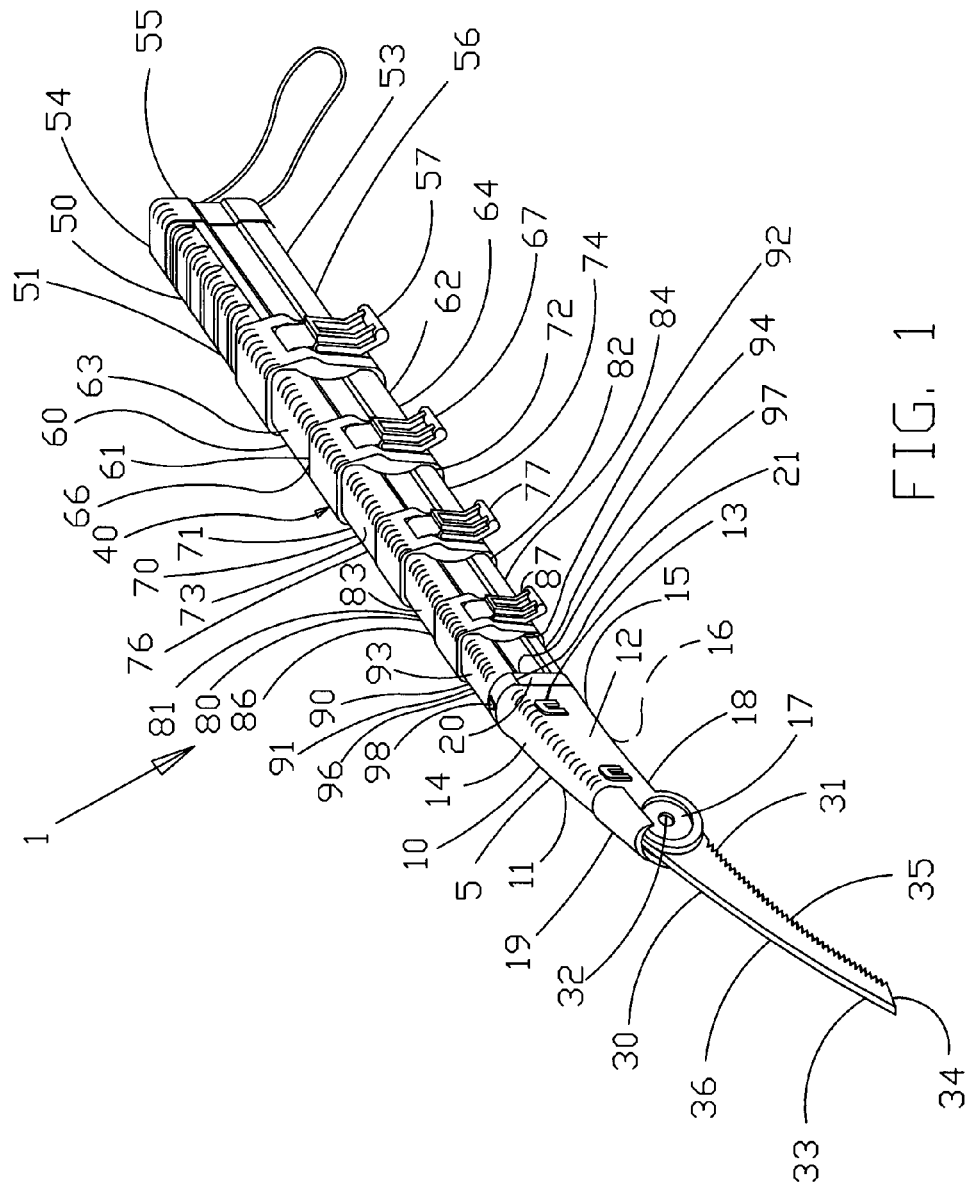
FIG. 1 is a perspective view of an embodiment of the present invention showing the extension rod partially extended.
Figure 2:
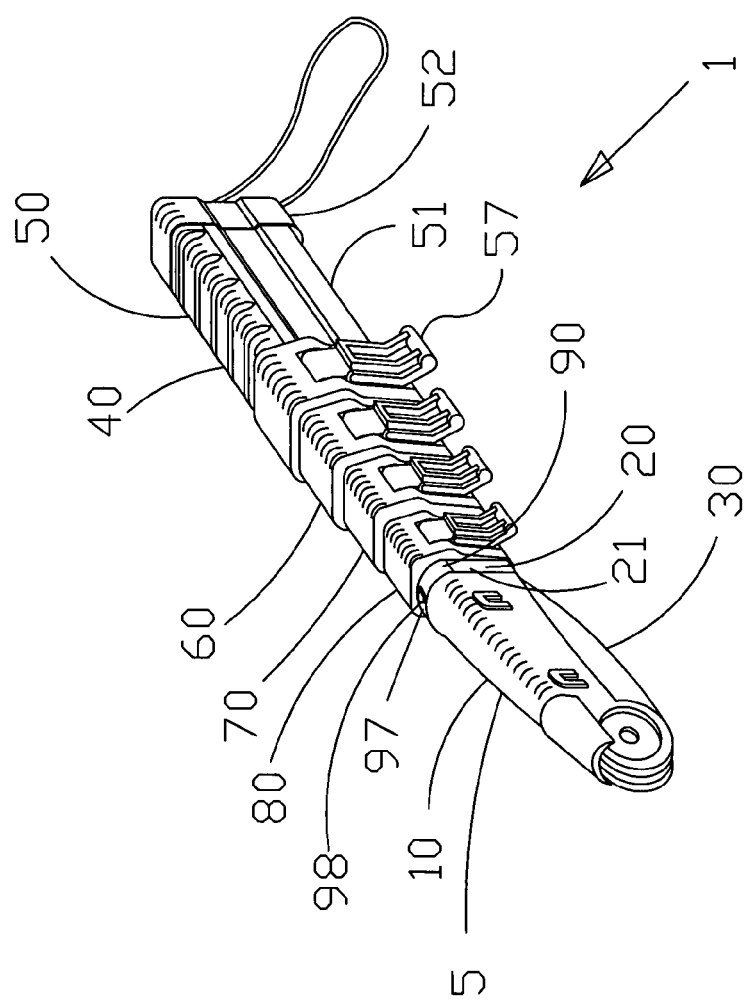
FIG. 2 is a perspective view of the embodiment shown in FIG. 1 with the extension rod retracted and connected to the saw.
Figure 3:
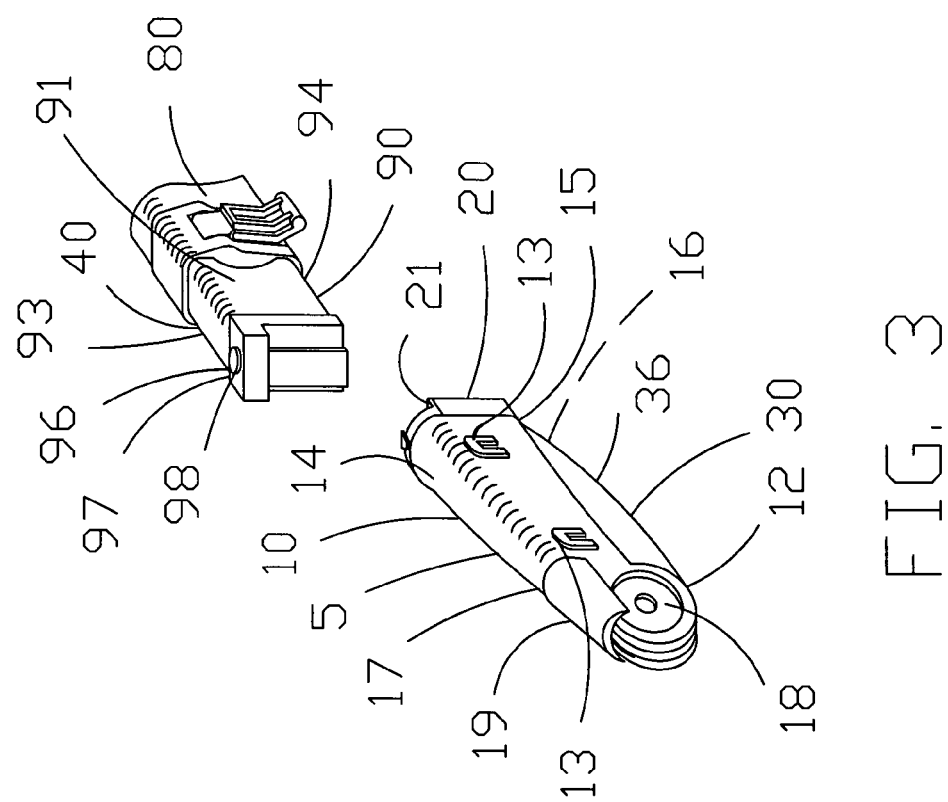
FIG. 3 is a close-up perspective view of the extension rod separated from the saw.

While the invention will be described in connection with several preferred embodiments, it will be understood that it is not intended to limit the invention to those embodiments. On the contrary, it is intended to cover all alternatives, modifications and equivalents as may be included within the spirit and scope of the invention as defined by the appended claims.

Looking now to FIGS. 1-4, it is seen that a first preferred embodiment of the extendable folding saw 1 of the present invention is shown. The extendable folding saw 1 is comprised of a folding saw 5 and an extension rod 40. It is understood that size of the present invention is relative, and that some degree of overall size variation is understood.

The folding saw 5 has a handle 10, or grip. The handle 10 has sides 11 and 12. Side 12 has a half of a pair of snaps 13 thereon. The handle 10 further has a top 14 and a bottom 15. The bottom 15 has a cavity therein. A pivot 18 and release 19, or blade release lever, are at an end 17 of the handle 10. The opposed end 20 has a snap fitting 21 thereon. The snap fitting 21 can comprise a channel having a generally T shaped profile. Holes can be in the side of the T shaped channel for receiving detents (described below). The handle 10 can be made of glass filled nylon or any other suitable material.

Snaps 13 can be of any desired configuration. However, in the preferred illustrated embodiment, the snaps have a first lip perpendicular to the side 12 and a second lip offset from and parallel to side 12. Further, a channel is formed through the second lip, and mating snaps (described below) can be removably connected to snaps 13.

The folding saw 5 further comprises a saw 30. The saw 30 has an end 31 with a pivot 32. Opposed to end 31 is end 33. End 33 terminates in a point 34. The saw 30 has a cutting edge 35 and an opposed dull edge 36. The blade can be made of a stainless steel or any other suitable material.

The pivot 32 of the saw is preferably pivotally connected to the pivot 18 of the handle 10. The cutting edge 35 of the saw 30 can be received within the cavity 16 in the bottom 15 of the handle 10, and the dull edge 36 can project from the cavity. When pivoted for use, the end 33 of the saw 30 is remote from the end 20 of the handle 10. It is understood that saw 30 is an interchangeable saw.

The extension rod 40, or simply the extension, can comprise a grip 50 and several members 60, 70, 80 and 90, respectively. More or less members can alternatively be used without departing from the broad aspects of the present invention. The grip 50 can be made from or covered with foam or rubber or any other material. The members 60, 70, 80 and 90 can be made of extruded aluminum or any other suitable material, and can respectively have uniform dimensions along their respective lengths. As illustrated herein, the extension 40 can be fully collapsed, fully extended, or positioned between fully collapsed and extended.

Grip 50 has a side 51. Side 51 has a half of a pair of snaps 52 thereon. The half of pair of snaps 52 can be mated, snapped or otherwise removably secured to the corresponding half of pair of snaps 13 on the handle 10 of the saw 5. This is accomplished in the preferred embodiment by providing a snap 14 with a shaft and a head, wherein the head is snapped into a cavity formed by the first and second lips of snap 13, and the shaft of snap 14 can pass between the channel formed through the second lip in snap 13.

Grip 50 further has an opposed side 53. An end 54 is provided. An end cap 55 can cover end 54 of the grip. A lanyard can be connected to the end cap 55. End 56 is opposite of end 55. End 56 is preferably an open end opening to the hollow interior of the grip. A compression latch 57 is preferably at the end 56 of the grip. The body of the grip has a generally I shaped cross-section, and has a uniform profile along its length.

Extension member 60 has side 61, side 62, top 63, bottom 64, a first end, and a second end 66. A compression latch 67 is at the second end 66 of the extension member 60. The sides 61 and 62, the top 63 and the bottom 64 define a generally I shaped cross-section and has a uniform profile along its length. The body of extension member 60 is slightly smaller than the body of the grip 50, wherein the extension member 60 can telescopingly mate with the grip. This is accomplished as the first end of the extension member 60 is received within the second end 56 of the grip 50. Compression latch 57 of the grip 50 can lock the extension member 60 in a selected linear position relative to the grip 50.

Extension member 70 has side 71, side 72, top 73, bottom 74, a first end, and a second end 76. A compression latch 77 is at the second end 76 of the extension member 70. The sides 71 and 72, the top 73 and the bottom 74 define a generally I shaped cross-section and has a uniform profile along its length. The body of extension member 70 is slightly smaller than the body of extension member 60, wherein the extension member 70 can telescopingly mate with the extension member 60. This is accomplished as the first end of the extension member 70 is received within the second end 66 of extension member 60. Compression latch 67 of extension member 60 can lock the extension member 70 in a selected linear position relative to the extension member 60.

Extension member 80 has side 81, side 82, top 83, bottom 84, a first end, and a second end 86. A compression latch 87 is at the second end 86 of the extension member 80. The sides 81 and 82, the top 83 and the bottom 84 define a generally I shaped cross-section and has a uniform profile along its length. The body of extension member 80 is slightly smaller than the body of extension member 70, wherein the extension member 80 can telescopingly mate with the extension member 70. This is accomplished as the first end of the extension member 80 is received within the second end 76 of extension member 70. Compression latch 77 of extension member 70 can lock the extension member 80 in a selected linear position relative to the extension member 70.

Extension member 90 has side 91, side 92, top 93, bottom 94, a first end, and a second end 96. The sides 91 and 92, the top 93 and the bottom 94 define a generally I shaped cross-section and has a uniform profile along its length. The body of extension member 90 is slightly smaller than the body of extension member 80, wherein the extension member 90 can telescopingly mate with the extension member 80. This is accomplished as the first end of the extension member 90 is received within the second end 86 of extension member 80. Compression latch 87 of extension member 80 can lock the extension member 90 in a selected linear position relative to the extension member 80.

A snap fitting 97 is at the second end 96 of extension member 90. The snap fitting 97 can be comprised of a generally T shaped piece. Detents can be selectably projectable from the sides of the T shaped piece. The snap fitting 97 mates with snap fitting 21 by sliding the T generally shaped piece into the generally T shaped channel of the folding saw 5 to directly connect these two components. A release button 98 is provided to allow the snap fittings 97 and 21, respectively, to be disengaged. Pressing the release button 98 causes the detents to retract into the generally T shaped member to allow the generally T shaped piece to slide out of engagement with the generally T shaped channel.

Figure 4:
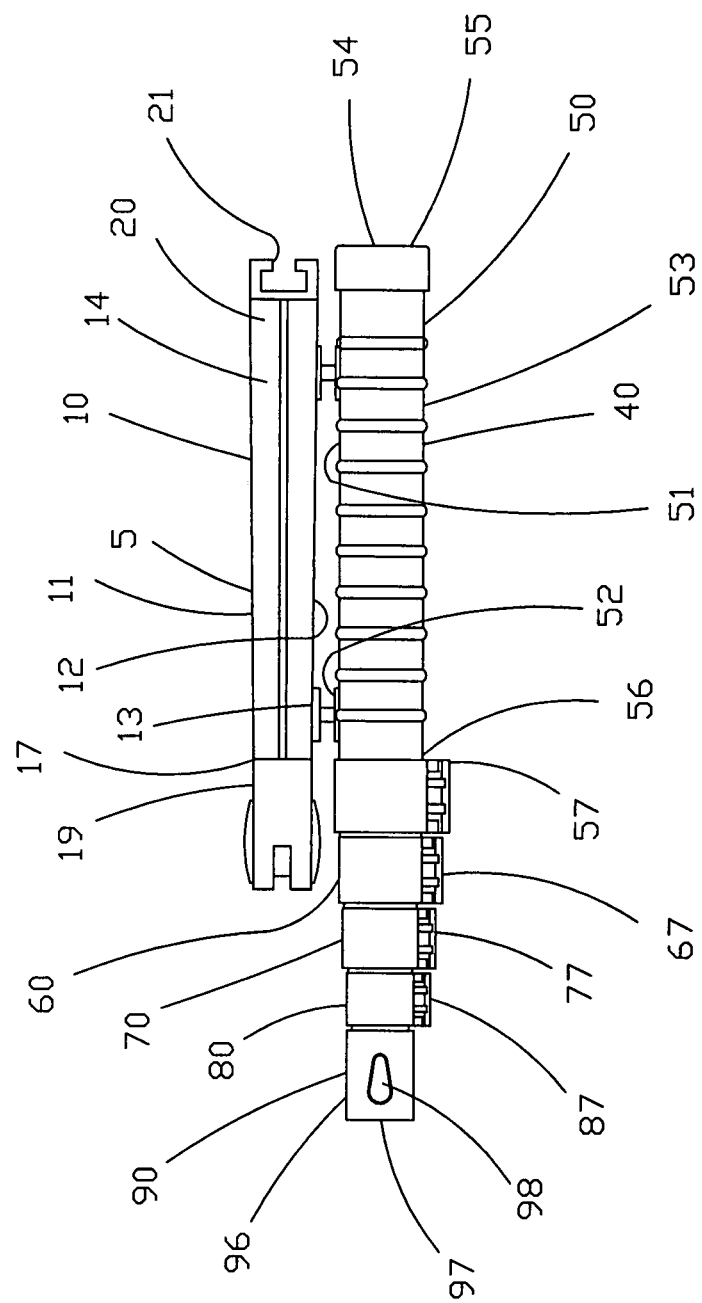
FIG. 4 is a top view of the extension rod and saw in the storage position.

Looking now more closely at FIG. 4, it is seen that the folding saw 5 and extension rod 40 can be stored in a side-by-side manner by mating the snaps 13 and 52, respectively on side 12 of the handle 10 of the folding saw 5 and on side 51 of the grip 50 of the extension rod 40.

It is appreciated that the extension members 60, 70, 80 and 90 have a similar but not necessarily equal length, and each is similar in length but not necessarily equal to the length of the grip 50.

It is further appreciated that a twisting lock, or other suitable lock, could be used in place of the compression latch flaps without departing from the broad aspects of the present invention.

It is still further appreciated that the overall length of the extension rod 40 is variable. This is accomplished by having one or more or the extension members 60, 70, 80 and 90, respectively, be locked in place somewhere intermediate fully extended and fully retracted.

It is understood that the illustrated compression latches operate by constricting the interior size of its respective member upon the member received there within. Yet, it is further understood that alternative latches or compression latches can be utilized without departing from the broad aspects of the present invention. For example, the latch could be operated to drive a pin into a channel in the adjacent received member. Unfastening of the latch would remove the pin from the corresponding slot. It is appreciated that one or more extension members could be extended while the others remain locked in their respective retracted positions.

Turning now to FIGS. 5-7, an alternative embodiment is shown. This embodiment has a saw 101 comprised of a first piece 110 with a grip 111 and a cavity 112. The grip can be comprised of a rubber overmolding.

A second piece 120 is provided having a grip 121, a hollow interior 122 and a compression latch 123. The grip 121 can be comprised of a rubber overmolding. The second piece 120 is pivotally connected to the first piece 110, such that cavity 112 of the first piece 110 faces the hollow interior 122 of the second piece 120 when pivoted to the closed position.

A third piece 130 is further provided. The third piece 130 can comprise a beam 131, which may have a generally I shaped profile. The third piece 130 has two ends. The first end is connected to the second piece 120, and can be removably slid therein into the hollow interior 122. The compression latch 123 is used to lock the third piece 130 in a desired linear position relative the second piece 120. The position can be fully retracted as shown in FIG. 6, fully extended as shown in FIG. 5, or any position intermediate fully extended and fully retracted. A compression latch 132 can be located at the second end of the beam 131.

A fourth piece 140 is further provided. The fourth piece 140 can comprise a beam 141, which may have a generally I shaped profile. The fourth piece 141 has two ends. The first end is connected to the third piece 130, and can be removably slid therein into the hollow interior of the beam 131. The compression latch 132 of the third piece 130 is used to lock the fourth piece 140 in a desired linear position relative the third piece 130. The position can be fully retracted as shown in FIG. 6, fully extended as shown in FIG. 5, or any position intermediate fully extended and fully retracted. A blade lock 142 can be located at the second end of the beam 141.

A blade 150 is further provided. The blade has a cutting edge 151 and a dull edge 152. The blade 150 further has two ends. The first end is pivotally connected to the second end of beam 141. When the saw 101 is fully compacted, the dull edge 152 of the blade 151 is fully received within the cavity 112 of the first piece 110. Blade lock 142 can be used to maintain the position of the blade 150 when the saw 101 is in the fully extended position and the shortened position.

Figures 8, 9:
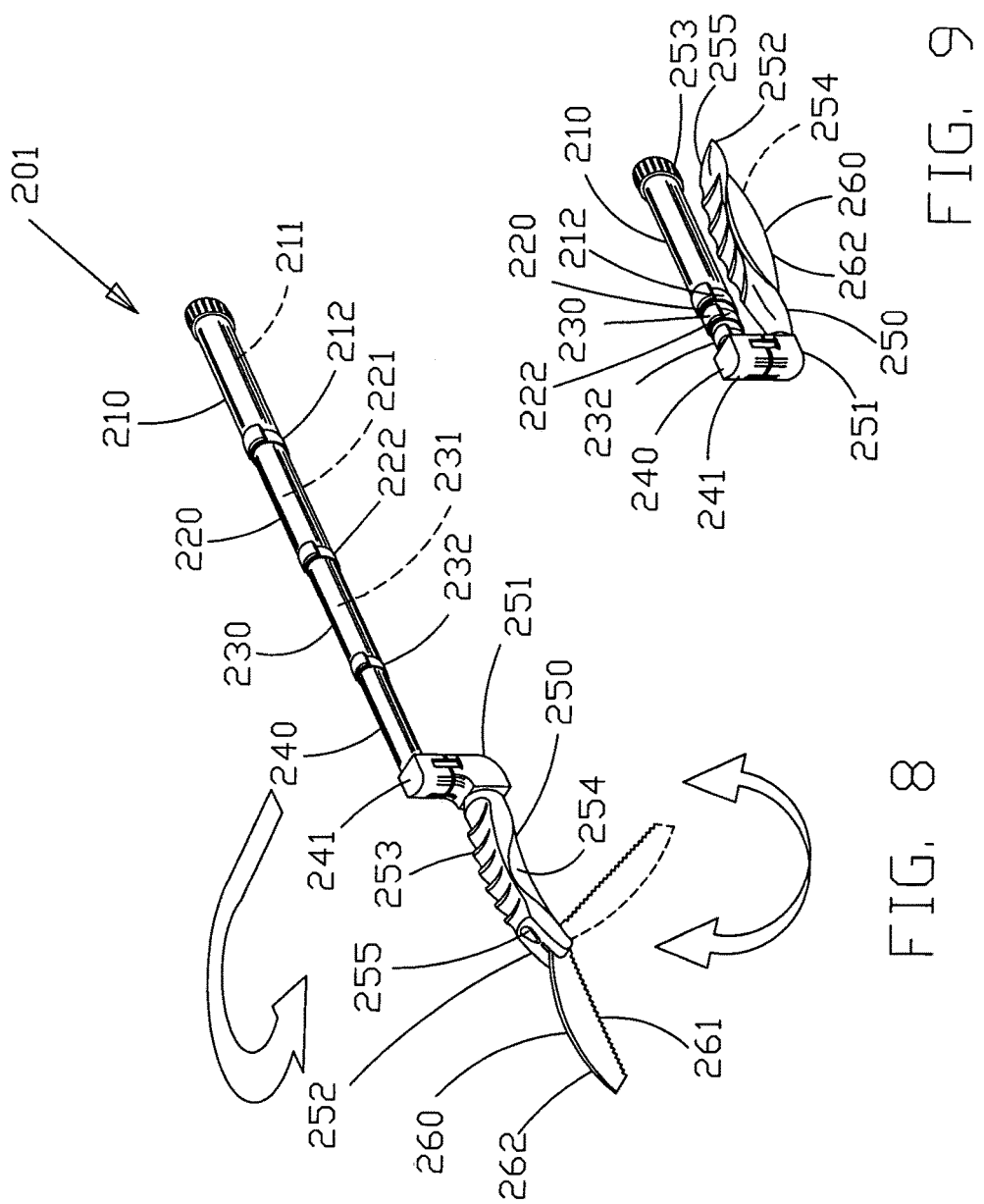
FIG. 8 is a perspective view of an additional alternative embodiment of the present invention shown in an extended position.
FIG. 9 is a perspective view of the embodiment shown in FIG. 8 in a compacted position.

Turning now to FIGS. 8 and 9, it is shown that an additional alternative embodiment is shown. A saw 201 is provided. The saw has a first piece 210. The first piece 210 has two ends. The first end is closed with a cap. A compression latch 212 can be at the second end. The second end is an open end that is open to a hollow cavity 211.

A second piece 220 is also provided. The second piece 220 has two ends, and is hollow to define a cavity 221. A compression latch 222 is on the second end of the second piece 220. The first end is connected to the first piece 210, and can be removably slid therein into the hollow interior 211. The compression latch 212 is used to lock the second piece 220 in a desired linear position relative the first piece 210. The position can be fully retracted as shown in FIG. 9, fully extended as shown in FIG. 8, or any position intermediate fully extended and fully retracted.

A third piece 230 is also provided. The third piece 230 has two ends, and is hollow to define a cavity 231. A compression latch 232 is on the second end of the third piece 230. The first end is connected to the second piece 220, and can be removably slid therein into the hollow interior 221. The compression latch 222 is used to lock the third piece 230 in a desired linear position relative the second piece 220. The position can be fully retracted as shown in FIG. 9, fully extended as shown in FIG. 8, or any position intermediate fully extended and fully retracted.

A fourth piece 240 is also provided. The fourth piece 240 has a first end and a second end 241. The first end is connected to the third piece 230, and can be removably slid therein into the hollow interior 231. The compression latch 232 is used to lock the fourth piece 240 in a desired linear position relative the third piece 230. The position can be fully retracted as shown in FIG. 9, fully extended as shown in FIG. 8, or any position intermediate fully extended and fully retracted.

The first piece 210, second piece 220, third piece 230 and fourth piece 240 can have a generally circular shaped profile.

A fifth piece 250 is further provided. The fifth piece 250 has a first end 151 and a second end 252. A handle 253 is provided between the ends 251 and 252. A cavity 254 is provided. A lock 255 is on the second end 252 of the fifth piece 250. The first end 251 is both rotatably and removably connected to the end 241 of the fourth piece 240, as shown in FIG. 8. A pivot lock can be used to lock the fourth piece 240 and fifth piece 250 together in a selected orientation. A snap fitting mechanism can be used to enable removable connection of the end 241 of piece 240 and the end 251 of piece 250.

A blade 260 is further provided having a cutting edge 261 and a dull edge 262. The blade has a first end and a second end. The first end is pivotally connected to the fifth piece 250. The blade lock 255 releasably locks the blade 260 in a desired orientation with respect to the fifth piece 250.

The fifth piece 250 and blade 260 can be disconnected from the remainder of the pieces by disconnecting the first end 251 of the fifth piece 250 from end 141 of the fourth piece 240. In this regard, the fifth piece 250 and blade 260 can be used as a folding saw.

The saw 201 can be fully compacted. This is accomplished by pivoting the blade 260 into the cavity 254 of the fifth piece, rotating the fifth piece 250 relative the fourth piece 240 about end 241, retracting the fourth piece 240 into the third piece 230, retracting the third piece 230 into the second piece 220, and retracting the second piece 220 into the first piece 210.

Turning now to FIGS. 10 and 11, a further preferred embodiment is shown. Accordingly, a saw 301 is provided. The saw 301 has a first piece 310. The first piece 310 is comprised of a generally C shaped channel 311 having a first end 312 and a second end 313. A rubber grip pad can be affixed to the outside of the channel 311.

A second piece 320 is also provided. The second piece 320 is comprised of a generally C shaped channel 321 having a first end 322 and a second end 323. The first end 322 is pivotally connected to the second end 313 of the first piece 310. In this regard, the second piece 320 can collapse into the first piece 310 for storage.

A third piece 330 is also provided. The third piece 330 is comprised of a generally C shaped channel 331 having a first end 332 and a second end 333. The first end 332 is pivotally connected to the second end 323 of the second piece 320. In this regard, the third piece 330 can collapse into the second piece 320 for storage.

A fourth piece 340 is further provided. The fourth piece 340 has a first end 341 and a second end 342. A cavity 343 is also provided in the fourth piece 340. A blade lock 344 is on the second end 342 of the fourth piece 340. The first end 341 of the fourth piece 340 is pivotally connected to the second end 333 of the third piece 330. In this regard, the fourth piece 340 can collapse into the third piece 330 for storage.

A blade 350 is further provided. The blade 350 has a cutting edge 351 and a dull edge 352. The blade 351 further has a first end and a second end. The first end is pivotally connected to the second end 342 of the fourth piece 340. The blade lock 344 can be used to lock the blade 350 in position relative the fourth piece 340. The cutting edge 351 can be rotated into the cavity 343 of the fourth piece 340. The rotation of blade 350 relative the fourth piece 340 occurs along an axis that is generally perpendicular the axis of rotation between the fourth piece 340 and third piece 330, the third piece 330 and the second piece 320, and the second piece 320 and the first piece 310.

The blade 350 can be released from the cavity 343 of the fourth piece 340 only when the fourth piece is rotated out of the third piece 330.

Turning now to FIGS. 12 and 13, it is seen that an additional alternative preferred embodiment is shown. The saw 401 has a first component 410 and a second component 450.

The first component 410 has an end piece 420. The end piece 420 has two ends. The first end is closed with a cap. A compression latch can be at the second end. The second end is an open end that is open to a hollow cavity. An elastic band 425 is preferably attached to the end piece 420.

A first extension rod 430 is also provided. The first extension rod 430 has two ends, and is hollow to define a cavity. A compression latch is on the second end of the first extension rod. The first end is connected to the end piece, and can be removably slid therein into the hollow interior. The compression latch of the end piece is used to lock the first extension rod in a desired linear position relative the end piece. The position can be fully retracted as shown in FIG. 13, fully extended as shown in FIG. 12, or any position intermediate fully extended and fully retracted.

A second extension rod 440 is also provided. The second extension rod 440 has two ends, and is hollow to define a cavity. The first end is connected to the first extension piece 430, and can be removably slid therein into the hollow interior. The compression latch of the first extension rod 430 is used to lock the second extension rod 440 in a desired linear position relative the first extension rod 430. The position can be fully retracted as shown in FIG. 13, fully extended as shown in FIG. 12, or any position intermediate fully extended and fully retracted. The second end of the second extension rod is preferably externally threaded.

The second component 450 has an end piece 460. The end piece 460 has two ends. A blade 470 is pivotally attached to the first end of the end piece 460. A blade release is provided for locking the blade 470 in the open position. The blade 40 can be pivoted to a closed position wherein it is stored in a cavity in the end piece 460. A compression latch can be at the second end. The second end is an open end that is open to a hollow cavity.

A first extension rod 480 is also provided. The first extension rod 480 has two ends, and is hollow to define a cavity. A compression latch is on the second end of the first extension rod. The first end is connected to the end piece, and can be removably slid therein into the hollow interior. The compression latch of the end piece is used to lock the first extension rod in a desired linear position relative the end piece. The position can be fully retracted as shown in FIG. 13, fully extended as shown in FIG. 12, or any position intermediate fully extended and fully retracted.

A second extension rod 490 is also provided. The second extension rod 490 has two ends, and is hollow to define a cavity. The first end is connected to the first extension piece 480, and can be removably slid therein into the hollow interior. The compression latch of the first extension rod 480 is used to lock the second extension rod 490 in a desired linear position relative the first extension rod 480. The position can be fully retracted as shown in FIG. 13, fully extended as shown in FIG. 12, or any position intermediate fully extended and fully retracted.

A coupler 495 is preferably attached to the second end of the second extension rod 490 of the second component 450.

The coupler is preferably internally threaded so as to be able to mate with the externally threaded end of the second extension rod 440 of the first component 410.

The saw 410 can be compacted, as shown in FIG. 13. This is accomplished by first disengaging the first component 410 and second component 450 by threadably removing the end of the second extension rod 440 of the first component 410 from the coupler 495. Next each of the first component 410 and the second component 450 are individually compacted. Finally, the first and second components 410 and 450 are secured together with the elastic band 425.

Thus it is apparent that there has been provided, in accordance with the invention, an extendable folding saw that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A pole saw comprising:

a saw blade having a blade proximal end, a blade distal end, a length extending between the blade proximal and distal ends, and a cutting edge, the saw blade having opposite side faces facing transversely with respect to the cutting edge, the saw blade lying in a blade plane such that the side faces are positioned on opposite sides of the blade plane and are generally parallel with the blade plane, an elongate pole having a pole proximal end, a pole distal end, and a length extending between the pole proximal and distal ends, the pole including at least first and second pole sections, the first pole section being telescopically movable in the second pole section for selectively increasing and decreasing the length of the pole, the pole defining a pole longitudinal center axis extending along the length of the pole, the pole longitudinal center axis lying in a pole plane dividing the pole longitudinally into a portion to a first side of the pole plane and another portion to a second side of the pole plane opposite the first side, and the pole including an end adaptor at the pole distal end, an elongate blade support formed separately from the saw blade, the blade support being constructed for mounting the saw blade on the pole and supporting the blade for cutting, the blade support having a blade support proximal end, a blade support distal end, and a length extending between the blade support proximal and distal ends, the length of the blade support being greater than a width of the blade support perpendicular to the length, the blade support defining a blade support longitudinal center axis extending along the length of the blade support, the blade support longitudinal center axis lying in a blade support plane dividing the blade support longitudinally into a portion to a first side of the blade support plane and another portion to a second side of the blade support plane opposite the first side, the blade support being selectively configurable in an extended use position and a pole adjacent storage position different than the extended use position, the blade support in the extended use position being positioned differently with respect to the pole distal end than when the blade support is in the pole adjacent storage position, the blade support in the extended use position being connected to the pole end adaptor and positioned for supporting the saw blade for cutting, the blade support in the pole adjacent storage position being connected to the pole end adaptor and extending alongside the pole adjacent to and outside the pole for supporting the saw blade for storage, the blade support having a first pivot connection with the saw blade, the first pivot connection defining a first pivot axis, the saw blade being selectively pivotable about the first pivot axis between a deployed position with respect to the blade support and a protected position with respect to the blade support different than the deployed position, the saw blade in the deployed position having the cutting edge exposed for cutting, and the saw blade in the protected position having the cutting edge shielded by the blade support for protecting the cutting edge, the blade support having a second pivot connection with the pole end adaptor, the second pivot connection defining a second pivot axis, the blade support together with the blade being pivotable with respect to the pole about the second pivot axis between the extended use position and the pole adjacent storage position, the second pivot connection being offset from the pole longitudinal center axis to the first side of the pole plane, the second pivot connection being offset from the blade support longitudinal center axis to the first side of the blade support plane, wherein the second pivot axis is generally perpendicular to the pole longitudinal center axis and generally perpendicular to the first pivot axis, wherein when the blade support is in the extended use position and the saw blade is in the deployed position the blade plane is generally perpendicular to the first pivot axis and generally codirectional with the second pivot axis, the blade plane is generally codirectional with the blade support longitudinal center axis and the pole longitudinal center axis, the blade plane intersects the pole, the blade distal end is positioned distally with respect to the blade support distal end, and the blade support distal end is positioned distally with respect to the pole distal end, and wherein when the blade support is in the pole adjacent storage position and the saw blade is in the protected position the first side of the blade support plane faces the first side of the pole plane, the pole distal end is closer to the blade distal end than the blade proximal end, the blade distal end is closer to the pole than when the blade support is in the extended use position and the saw blade is in the deployed position, and the opposite side faces and cutting edge of the blade face in respective predetermined directions with respect to the pole.

2. A pole saw as set forth in claim 1 wherein the blade support has a recess configured for receiving the cutting edge of the saw blade when the saw blade is in the protected position.

3. A pole saw as set forth in claim 1 wherein when the blade support is in the extended use position and the saw blade is in the deployed position the second pivot axis lies in the blade plane.

4. A pole saw as set forth in claim 1 wherein when the blade support is in the extended use position and the saw blade is in the deployed position the pole longitudinal center axis lies in the blade plane.

5. A pole saw as set forth in claim 1 wherein when the blade support is in the extended use position and the saw blade is in the deployed position the blade support longitudinal center axis lies in the blade plane.

6. A pole saw as set forth in claim 1 wherein when the blade support is in the extended use position and the saw blade is in the deployed position the blade plane intersects the pole end adaptor.

7. A pole saw as set forth in claim 1 wherein when the blade support is in the extended use position and the saw blade is in the deployed position the blade plane intersects the pole along substantially the entire length of the pole.

8. An extendable folding saw comprising:
   a handle having a handle first end and a handle second end, and a handle first side and a handle second side, said handle comprising a plurality of handle snaps on said handle first side;
   a blade selectively retractable into said handle and extendable from said handle; and
   an extension removably connectable to said handle at said handle first end for an operational relationship with the handle, said extension having an extension first side and an extension second side, said extension comprising a plurality of extension snaps on said extension first side;
   wherein said plurality of handle snaps mate with said plurality of extension snaps to releasably lock said handle in a side by side relationship with said extension when said extension is removed from said handle first end for a storage relationship with the handle.

9. An extendable saw having an extendable saw top and an extendable saw bottom, said extendable saw comprising:
   a handle with a blade extendable from said handle, said blade having a cutting edge that is at said extendable saw bottom when extended from said handle;
   an extension comprising a plurality of extension members each having an I-shaped profile having an extension member top and an extension member bottom that are wider than an extension member mid-section, said plurality of extension members being selectively extendable from and collapsible into each other along a longitudinal center axis of the pole, each I-shaped profile providing support along said extension when said extension members are extended from each other;
   a snap fitting having:
      a channel with a T-shaped profile that extends vertically through said snap fitting along a single axis;
      a T-shaped piece configured to slidably mate with said channel along said single axis to form a snap-fitting engagement between said extension and said handle; and
      a release button configured to release the snap-fitting engagement to permit said T-shaped piece to be removed from said channel.

\* \* \* \* \*